(12) United States Patent
Ring et al.

(10) Patent No.: US 6,902,042 B2
(45) Date of Patent: Jun. 7, 2005

(54) AUTOMATIC APPLICATION HAND BRAKE WINDING MECHANISM

(75) Inventors: Michael E. Ring, Crown Point, IN (US); Scott Natschke, Kankakee, IL (US); Robert Herron, Charleston, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/217,570

(22) Filed: Aug. 13, 2002

(65) Prior Publication Data

US 2003/0111897 A1 Jun. 19, 2003

Related U.S. Application Data

(60) Provisional application No. 60/313,235, filed on Aug. 17, 2001.

(51) Int. Cl.[7] .............................................. B61H 13/00
(52) U.S. Cl. ............................ 188/33; 188/107; 303/13
(58) Field of Search ...................... 188/33, 107, 153 R, 188/3 R, 3 H, 72.1, 72.3, 72.6, 72.9, 73.1; 303/18, 9.61, 2, 3, 71

(56) References Cited

U.S. PATENT DOCUMENTS 2,940,554 A * 6/1960 Cameron ................ 188/153 R
4,978,178 A * 12/1990 Engle .......................... 303/13
5,794,739 A    8/1998 Ring et al.
6,039,158 A    3/2000 Fox et al.

FOREIGN PATENT DOCUMENTS

| EP | 1 127 770 A | 8/2001 |
| EP | 1 177 964 A | 2/2002 |
| GB | 872 098 A | 7/1961 |

* cited by examiner

Primary Examiner—Matthew C. Graham
Assistant Examiner—Mariano Sy
(74) Attorney, Agent, or Firm—James Ray & Associates (57) ABSTRACT

An automatic application hand brake mechanism is provided for automatically applying at least one brake member secured to a railway vehicle with the hand brake assembly. The mechanism comprises an operating member having at least one ratchet engageable with at least one gear of the hand brake assembly for operating the gear assembly in a direction which will cause an application of the at least one brake member. The apparatus also includes an application cylinder and a drive arm extending from an end thereof having a first portion which is connected to the operating member. The drive arm is capable of reciprocating with respect to the application cylinder upon the application of a force thereto to supply a predetermined pressure to the operating member to cause an automatic application of the at least one brake member.

12 Claims, 10 Drawing Sheets

AUTOMATIC APPLICATION HAND BRAKE WINDING MECHANISM

CROSS-REFERENCES TO RELATED APPLICATIONS

This application claims the benefit of U.S. Provisional Application No. 60/313,235, filed Aug. 17, 2001. This application is also related to co-pending U.S. Ser. No. 09/507,227 entitled "Automatic Application Hand Brake", filed Feb. 18, 2000 and owned by the assignee of the present application. The disclosure of U.S. Ser. No. 09/507,227 is hereby incorporated by reference thereto.

FIELD OF THE INVENTION

The present invention relates, in general, to hand brake assemblies for use on railway type vehicles and, more particularly, this invention relates to an apparatus to automatically activate and apply the brakes on such railway vehicle without requiring an operator to manually wind the chain on such hand brake.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft.

The brakes may be released by disengaging the pawl from the detent wheel but this causes rapid rotation of the hand wheel and the gears of the gear train. To avoid rapid rotation of the hand wheel, hand brake mechanisms have been devised which are known as "quick release" mechanisms. Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

The Association of American Railroads (AAR) promulgates specifications for the design and operation of railway car hand brake mechanisms. Vertical wheel, gear train, hand brake mechanisms are classified in three categories, namely:

(1) Standard power—provides an average force on the chain of 3350 lbs. with a 125 lb. turning force applied to the rim of a wheel twenty-two inches in diameter.

(2) Intermediate power—provides an average force on the chain of 4475 lbs. with a 125 lb. turning force applied to the rim of a wheel twenty-two inches in diameter.

(3) High power—provides an average force on the chain of 6800 lbs. with a 125 lb. turning force applied to the rim of a wheel twenty-two inches in diameter.

After setting of the brakes, when the hand brake mechanism is released the gears of the gear train rotate rapidly. This results in the gears and other components being subjected to high forces and to shock, particularly, when the chain becomes fully let-out from the chain drum.

In recent times, the AAR has added a life cycle test to its specifications, and hand brake mechanisms which do not meet the life cycle test cannot be sold for use on railway cars operated in interchange service on United States railroads. The AAR life cycle test for quick release brakes requires that such latter brakes withstand 3000 quick release operations.

To meet such life cycle test requirements, even standard power hand brake mechanisms had to be modified when the life cycle test was adopted. When intermediate power hand brake mechanisms of the type sold prior to the adoption of the life cycle test were subjected to the life cycle test, it was found that the components thereof wore prematurely or were damaged, and it was found to be necessary to add a shock retarder, or absorber, external to the hand brake mechanism, to overcome such wear and damage. Of course, such an external shock retarder is undesirable not only because it is external to the hand brake mechanism but also because of the additional cost and because it requires field modification of the equipment on a railway car if the intermediate power hand brake mechanism is used to replace a standard power hand brake mechanism. High power hand brake mechanisms sold prior to the adoption of the life cycle test were similarly unable to pass the life cycle test. It should be borne in mind that such high power brake mechanisms normally have additional gears to provide the desired force on the chain, and this results in a higher speed of rotation of at least some of the gears during release of the hand brake mechanism.

Although the use of an external shock retarder might have solved the problems with the higher power hand brake mechanism, a change in the AAR specifications would have been required to permit the use of such an external shock retarder. Attempts were made to redesign the high power hand brake mechanism, such as by making it stronger, so that it would meet the life cycle test without the use of an external shock retarder, but the attempts were not successful.

One of the characteristics of railway car brakes with which the invention is concerned is that the force applied to the chain, and hence, the parts of the hand brake, is non-linear and depends on the extent to which the brakes are applied or released. Thus, as the brakes are applied, relatively little force is required to take up the slack in the chain and the brake rigging, but to meet AAR requirements, the final force on the chain must be as set forth herein before, namely, 3350 lbs. for a standard power brake, 4475 lbs. for an intermediate power brake and 6800 lbs. for a high power brake. After slack in the rigging is taken up, which may require, for example, 5–15 inches of chain travel, the force on the chain increases exponentially, e.g. from 200 lbs. to the final value, as the brake hand wheel is further turned to set the brakes. In reaching the final value after the slack is taken up, the chain may travel only two or three inches. Similarly, when the hand brake is released, the chain force decreases exponentially and reaches a relatively small value shortly after the hand brake is released.

As can be seen from the above-discussion, it would be advantageous to have an automatic application apparatus for applying the hand brake and thereby reduce the force required to apply the brakes. Aforementioned co-pending application Ser. No. 09/507,227 teaches an automatic application apparatus for applying the hand brake which has several advantages over the currently used hand brake application devices. However, based upon data collected on the initial design of the automatic application hand brake of co-pending application Ser. No. 09/507,227 (hereby referred to as Design I), it was determined that the design would not meet all of the design input criteria for air usage. These input criteria are as follows:

1. Operate using the 3,500 cubic in air capacity available within the emergency reservoir.

2. Apply full brake loads at 90 psi and a minimum of 70 psi initial reservoir pressures.

3. Maximum of 40 psi cylinder pressure during application.

4. Achieve a minimum vertical chain load of 3,350 lbs.

5. 18 inches minimum chain take-up.

The automatic application hand brake of the present invention improves upon the Design I automatic application hand brake in that it meets all of the design input criteria for air usage as set forth above.

SUMMARY OF THE INVENTION

An automatic application hand brake mechanism is provided for automatically applying at least one brake means secured to a railway vehicle with the hand brake assembly. The mechanism comprises an operating means having at least one ratchet. The at least one ratchet is engageable with at least one gear of a gear assembly disposed in a housing member of the hand brake assembly for operating the gear assembly in a direction which will cause an application of the at least one brake means. The apparatus also includes an application cylinder mounted on the railway vehicle and a drive arm extending from an end of the application cylinder. The drive arm has a first portion which is connected to the operating means. The drive arm is capable of reciprocating with respect to the application cylinder upon the application of a force thereto to supply a predetermined pressure to the operating means at least a sufficient amount so as to cause an application of the at least one brake means. A means is connected to the application cylinder for supplying a force to the drive arm thereby causing an automatic application of the at least one brake means by the hand brake assembly.

OBJECTS OF THE INVENTION

It is, therefore, a primary object of the present invention to provide an apparatus engageable with a hand brake assembly which automatically activates and applies the brakes on a railway vehicle.

Another object of the present invention is to provide an apparatus engageable with a hand brake assembly which automatically activates and applies the brakes on a railway vehicle which eliminates the need of an operator to manually wind the chain on such hand brake.

Yet another object of the present invention is to provide an apparatus engageable with a hand brake assembly which will significantly reduce the time and effort required by an operator to apply such hand brake by virtue of the fact that the means used to initiate an application of the hand brake is rather simple and relatively easy to use.

Still another object of the present invention is to provide an apparatus engageable with a hand brake assembly which enables the apparatus to be used by an operator of basically any physical size or stature.

A further object of the present invention is to provide an apparatus engageable with a hand brake assembly that is safer to use by an operator by eliminating the need to manually wind the chain on such hand brake that could cause unnecessary physical strain on the operator thus greatly reducing the chance for injury.

An even further object of the present invention is to provide an apparatus engageable with a hand brake assembly on a railway vehicle which will provide the necessary torque to set such hand brake properly.

A still further object of the present invention is to provide an apparatus engageable with a hand brake assembly on a railway vehicle which will substantially minimize the possibility of an operator improperly setting the hand brake by not applying enough torque thereby leaving such railway vehicle somewhat free to cause serious damage and/or possible injury to railroad personnel or, on the other hand, applying too much torque thereby possibly damaging the brake rigging of such hand brake.

An additional object of the present invention is to provide an automatic application hand brake for a railway car which can be powered by a motor, such as, an electric motor, a pneumatic motor, or a hydraulic motor.

Another additional object of the invention to provide an automatic application hand brake which has reduced weight, is a more compact design and increases air usage efficiencies than prior automatic application hand brakes.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

DETAILED DESCRIPTION OF THE INVENTION

The following background information is provided to assist the reader to understand the environment in which the invention will typically be used. The terms used herein are not intended to be limited to any particular narrow interpretation unless specifically stated otherwise in this document.

Figure 2:
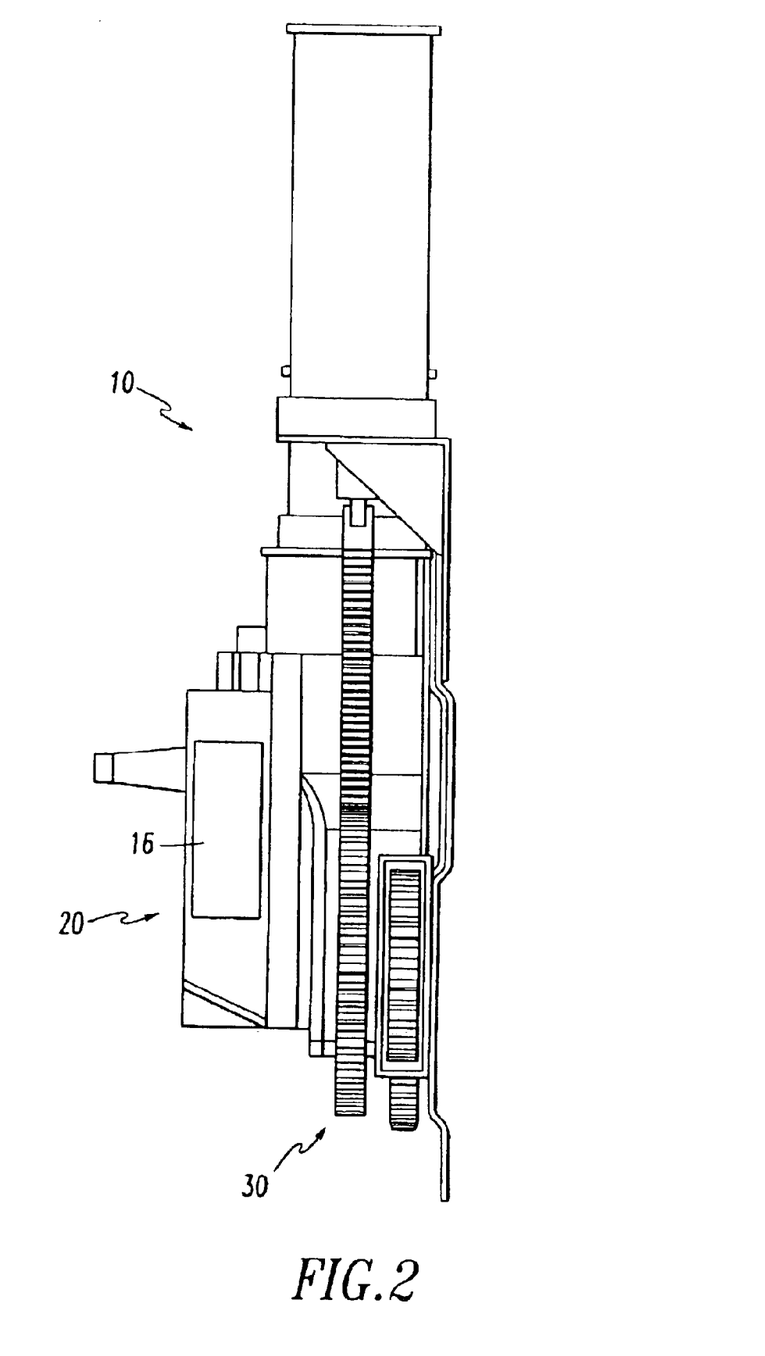
FIG. 2 is a side elevation view of the hand brake assembly illustrated in FIG. 1.
Figure 3:
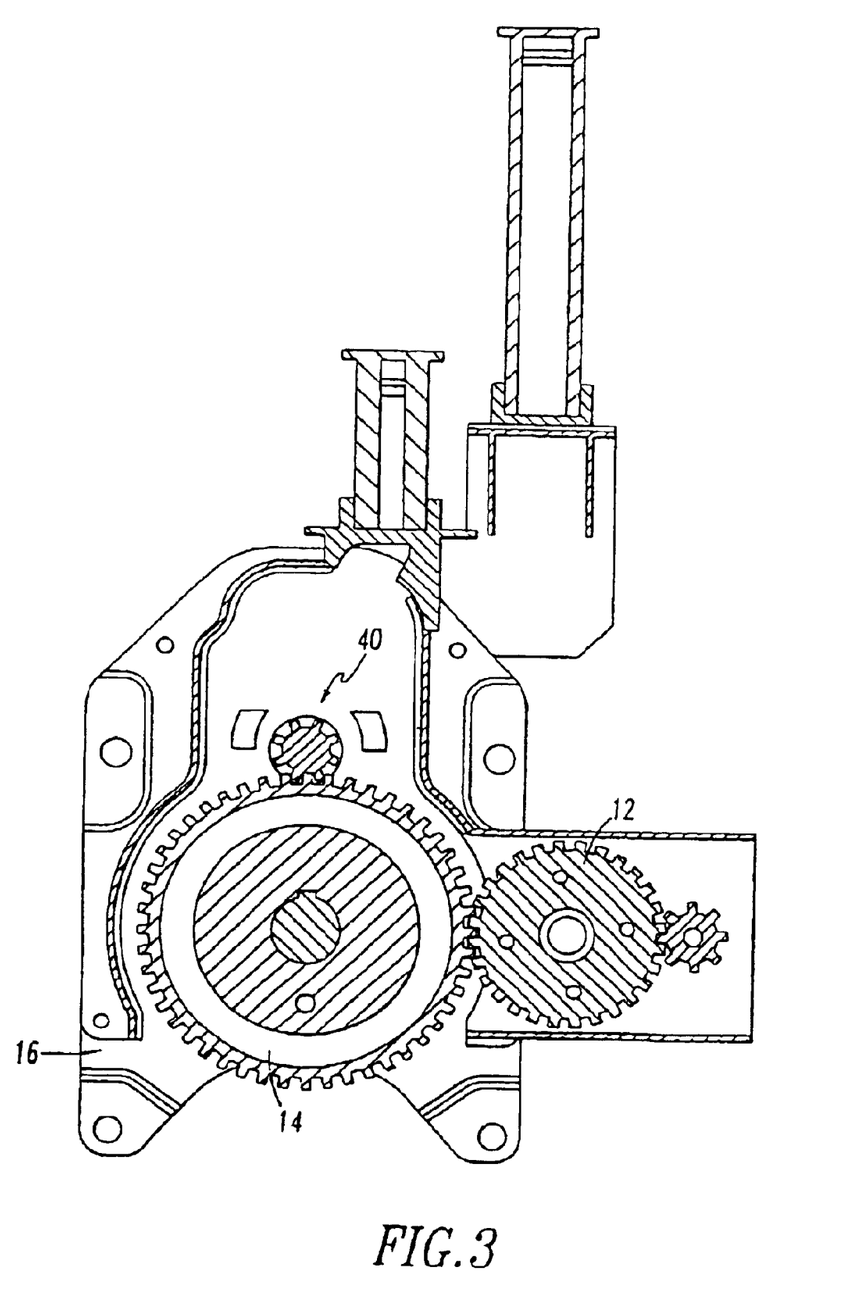
FIG. 3 is a front elevation view of the hand brake assembly illustrated in FIGS. 1 and 2 with the front cover removed.
Figure 3A:
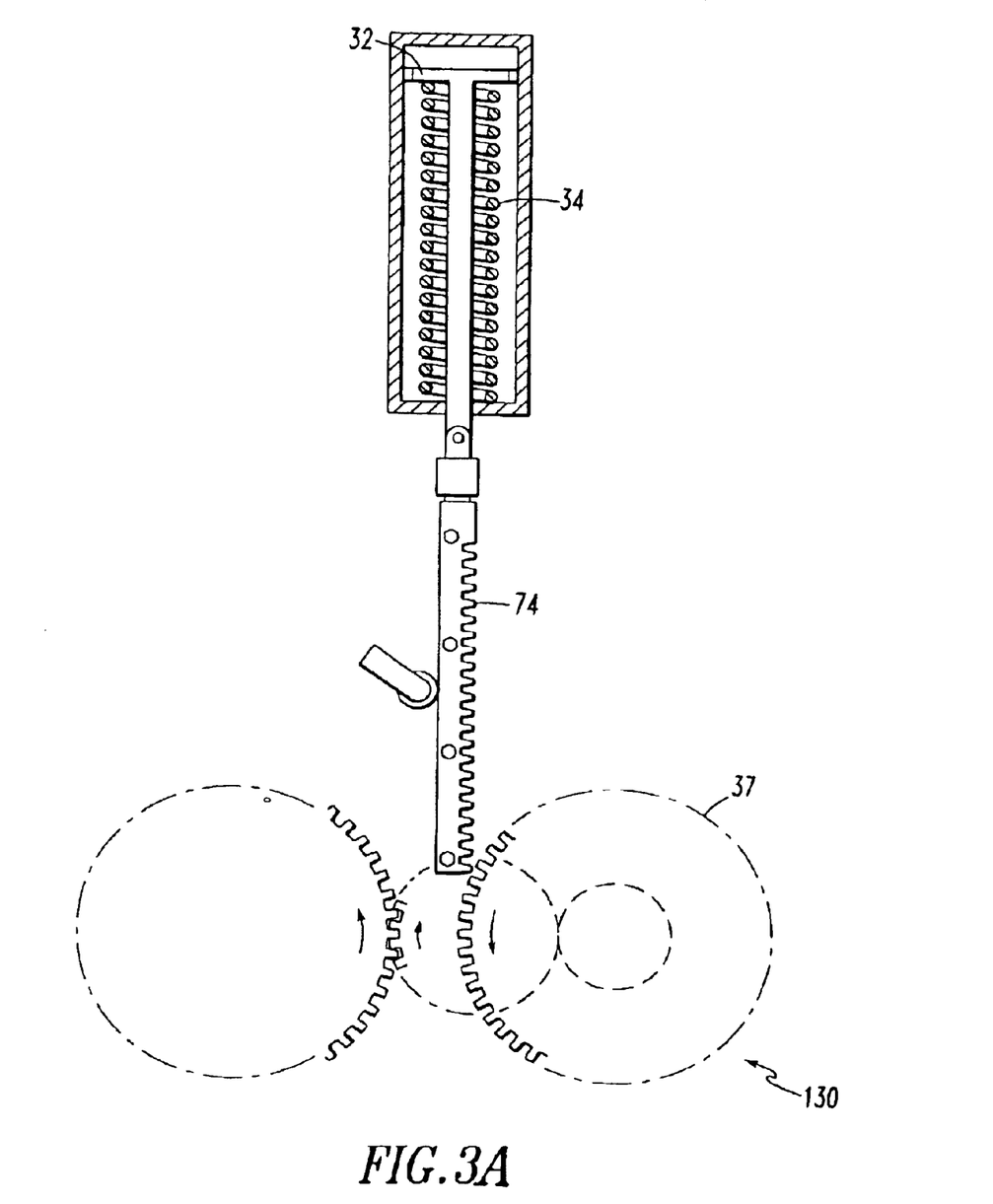
FIG. 3A is a side elevation view partially in cross section of a cylinder portion of the operating mechanism connected to a rack assembly engageable with a gear portion of the operating mechanism for use with the hand brake assembly illustrated in FIGS. 1 and 2.
Figure 4:
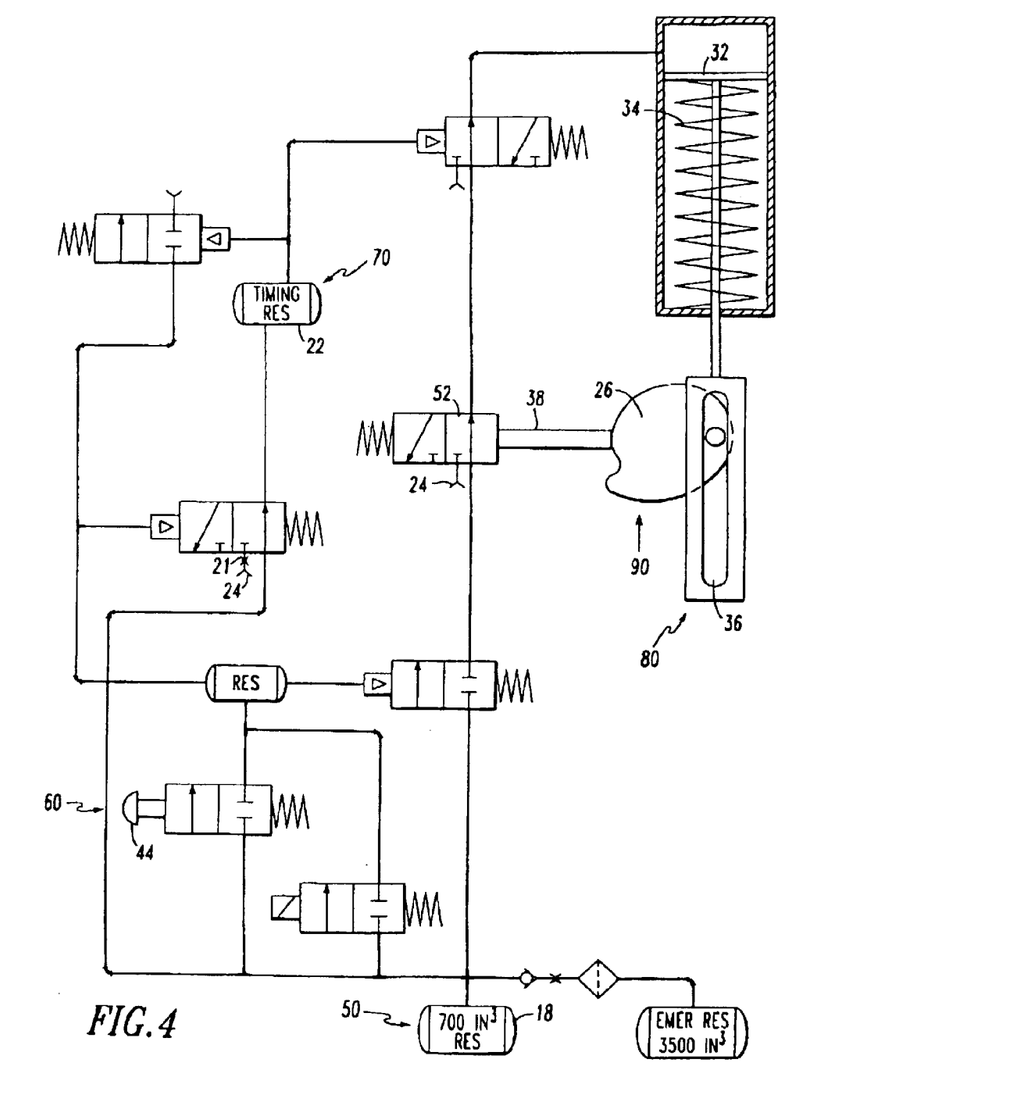
FIG. 4 is a schematic illustration of the presently preferred operating mechanism including an activation means for use with the hand brake assembly of Design I, as well as, for use with the presently disclosed automatic activation hand brake winding mechanism.
Figure 5:
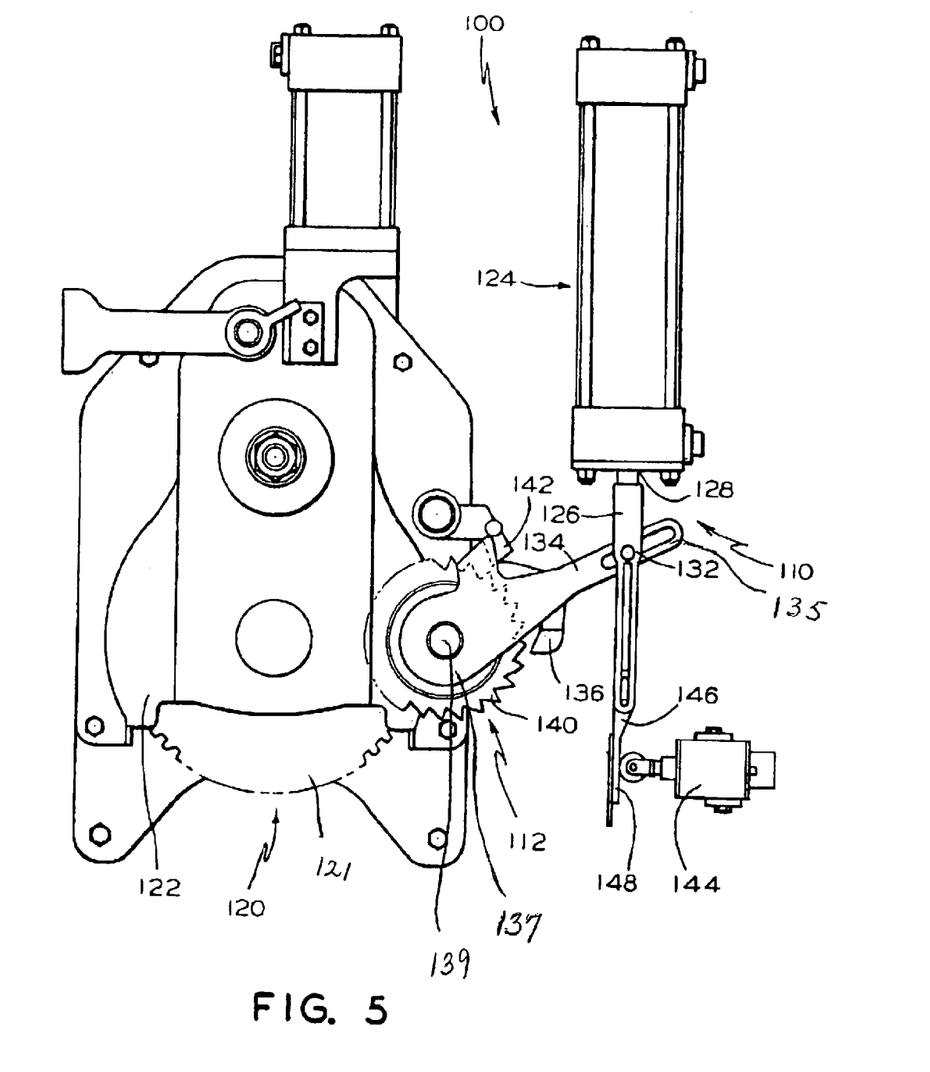
FIG. 5 is a front elevation view of a hand brake assembly incorporating a portion of the automatic application hand brake of the present application.
Figure 6:
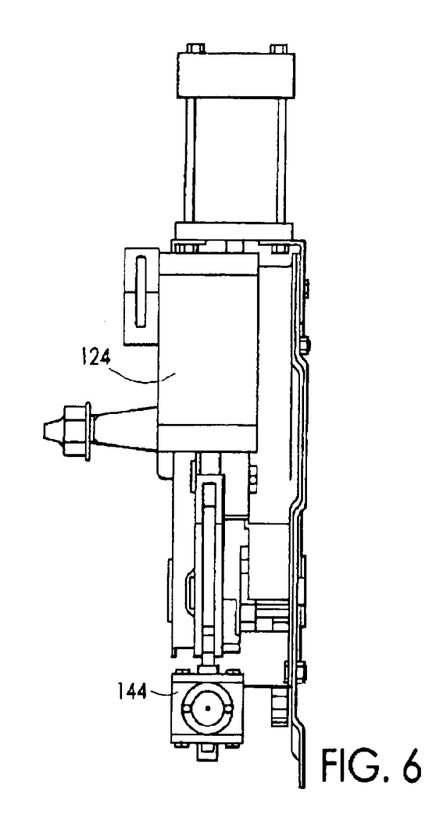
FIG. 6 is a side elevation view of the hand brake assembly illustrated in FIG. 5.
Figure 7:
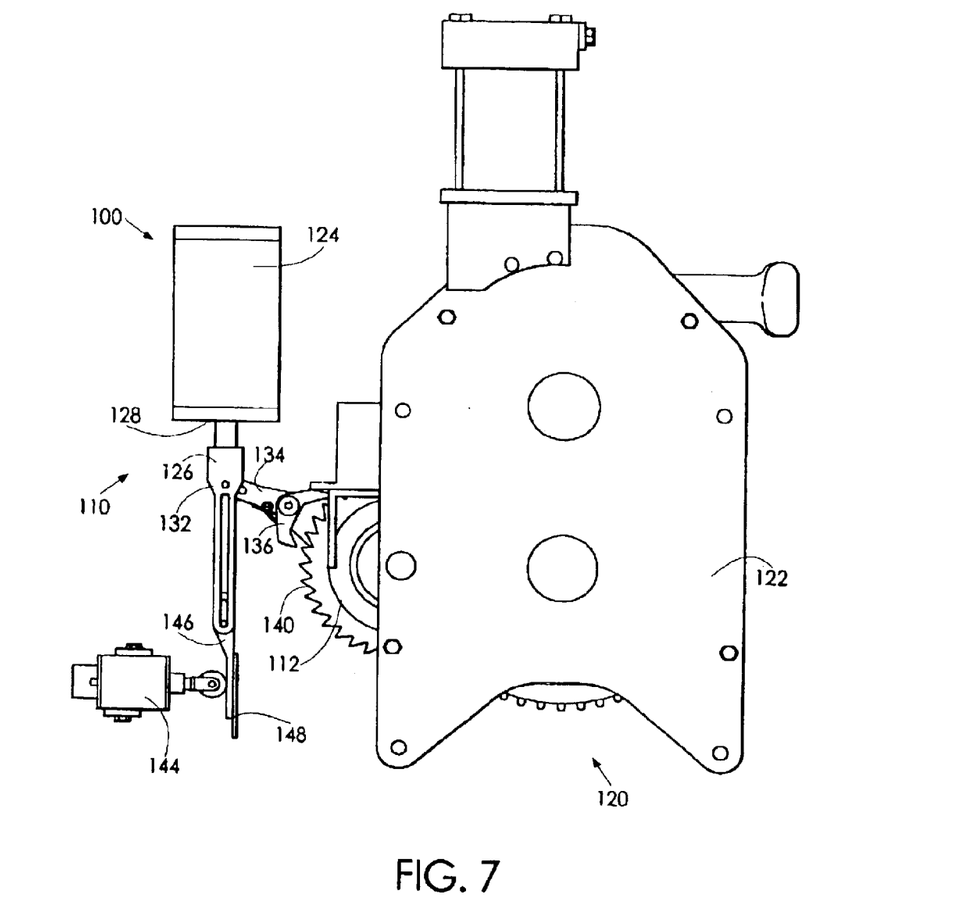
FIG. 7 is a back elevation view of the hand brake assembly incorporating a portion of the automatic application hand brake illustrated in FIG. 5.
Figure 8:
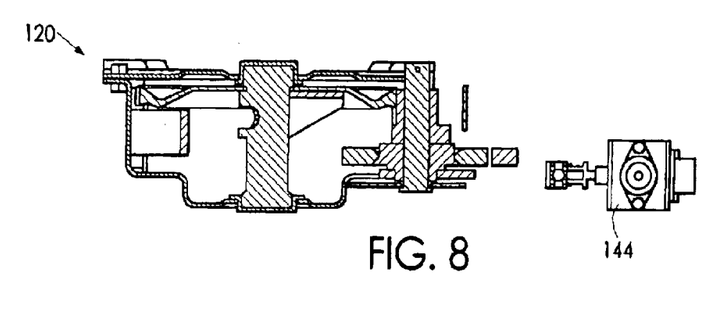
FIG. 8 is a portion of the automatic application hand brake taken along line A—A of FIG. 5.
Figure 9:
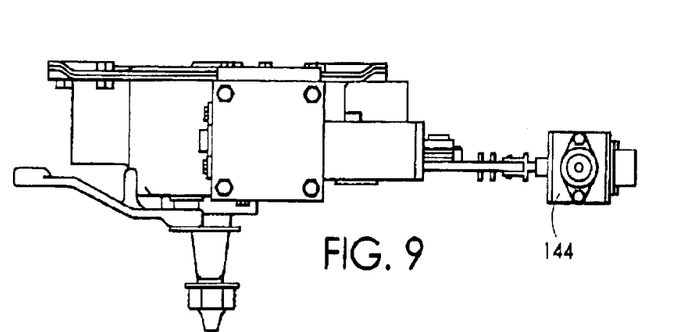
FIG. 9 is a top view of the hand brake assembly incorporating a portion of the automatic application hand brake illustrated in FIG. 5.
Figure 10:
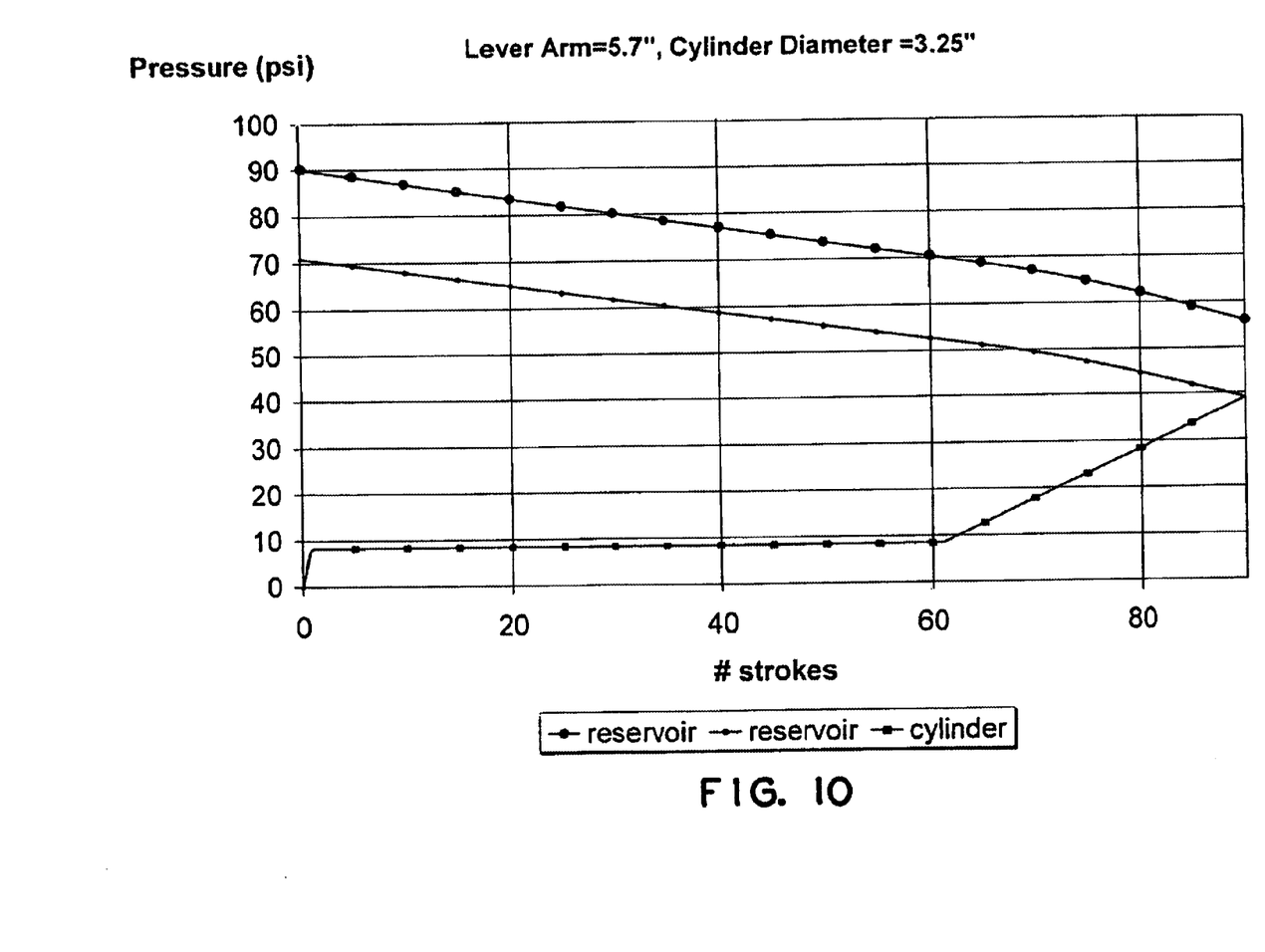
FIG. 10 is a graph illustrating numerical model results of one design at initial reservoir pressures of 90 psi and 70 psi.
Figure 11:
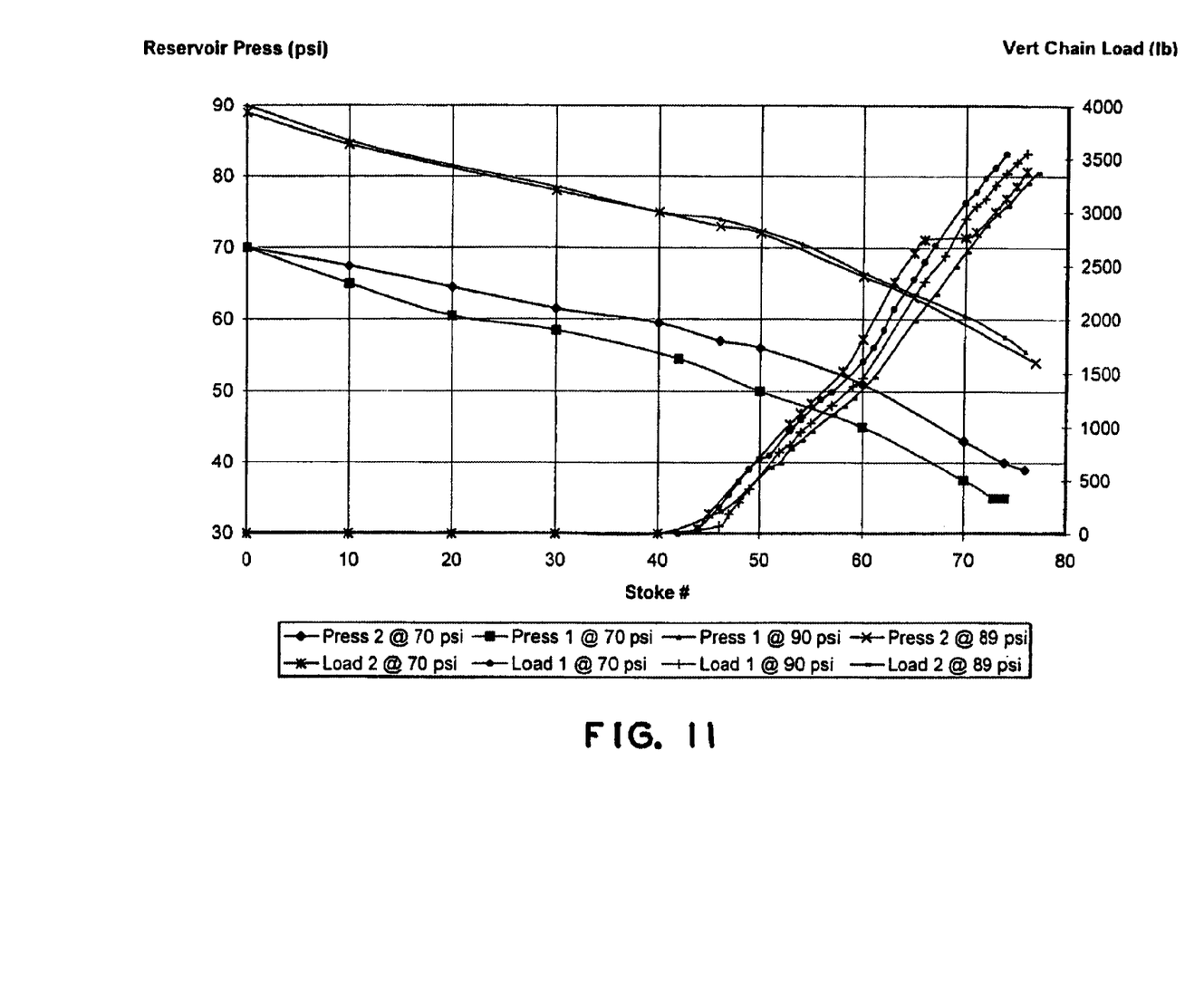
FIG. 11 is a graph illustrating results of reservoir pressure and chain load versus stroke obtained in manual tests on the present invention.

Referring now, more particularly, to FIGS. 1–3 and 3A of the drawings which are directed to the automatic hand brake application device of the aforementioned co-pending application Ser. No. 09/507,227. This automatic hand brake application device will be hereinafter referred to as Design I. FIG. 4 is a schematic illustration of the presently preferred operating mechanism including an activation means for use with the hand brake assembly of Design I, as well as, for use with the presently disclosed automatic activation hand brake winding mechanism. A discussion of this diagram will be included below.

Illustrated in FIGS. 1–4 is an apparatus, generally designated 10, which is engageable with a hand brake assembly, generally designated 20, for automatically applying at least one brake means (not shown) secured to a railway vehicle (not shown) with such hand brake assembly 20.

Such apparatus 10 includes an operating means, generally designated 30. As shown in FIG. 3, operating means 30 has at least a portion thereof, i.e., gear 12, engageable with at least one gear 14 of a hand brake gear assembly, generally designated 40, disposed in a housing member 16 of such hand brake assembly 20 for operating such gear assembly 40 in a direction which will cause an application of such at least one brake means.

The apparatus 10 further includes a source of fluid pressure, generally designated 50, connected to the operating means 30 for periodically supplying a predetermined pressure to such operating means 30 that is at least sufficient to cause such application of such at least one brake means. The presently preferred fluid pressure is pneumatic.

The final essential element of the apparatus 10 is a means, generally designated 60, which is connected to the source of fluid pressure, preferably a reservoir 18, for initiating the supply of such predetermined pressure to the operating means 30, thereby causing an automatic application of such at least one brake means by such hand brake assembly 20.

The apparatus 10 may be designed so as to include a timing means, generally designated 70. Such timing means 70 is connected intermediate such operating means 30 and the source of fluid pressure 50 for controlling such predetermined pressure being periodically supplied to the operating means 30. Timing means 70 preferably includes a choke 21 and a reservoir 22.

The apparatus 10 further includes an overload protection means, generally designated 80. Such overload protection means 80 has a first portion 24 thereof that is connected to such source of fluid pressure 50 and a second portion 26 thereof that is connected to the operating means 30 for preventing an overload on such at least one brake means.

The first portion 24 of the overload protection means 80 that is connected to such source of fluid pressure 50 acts as a means for venting fluid pressure from the plurality of valve means and such at least one valve means 28.

Additionally, the operating means 30 includes a piston member 32 connected to the source of fluid pressure 50. Such piston member 32 responding in a first direction in response to such fluid pressure and in an opposed second direction by means of a spring 34.

Preferably, the apparatus 10 further includes a valve shifting means, generally designated 90. A first portion 36 of the valve shifting means 90 is connected to such piston member 32 and a second portion 38 of such valve shifting means 90 is connected to valve 52 of such plurality of valve means.

The presently preferred means 60 for initiating the supply of such predetermined pressure to the operating means 30 is one of a push button 44 and a signal communicated to the means 60 for initiating such supply of predetermined pressure. The signal that is communicated to the means 60 for initiating such supply of predetermined pressure will be received, for example, by a solenoid valve 46. The most preferred means 60 for initiating the supply of predetermined pressure to the operating means 30 is push button 44.

It should be recognized that when the means 60 for initiating the supply of predetermined pressure to the operating means 30 is a signal communicated to such operating means 30 it may be either a radio frequency signal or, preferably, an electrical signal.

According to the most preferred embodiment of Design I invention, the apparatus 10, which is engageable with hand brake assembly 20, includes an operating means 30. At least one gear 12 of operating means 30 is engageable with at least one gear 14 of a gear assembly 40 which is disposed in a housing member 16 of such hand brake assembly 20 for operating such gear assembly 40 in a direction which will prompt an application of such at least one brake means (not shown).

The apparatus 10 also includes a source of fluid pressure 50 connected to the operating means 30 for periodically supplying a predetermined pressure to such operating means 30 that is at least sufficient to cause the application of the brake means. The presently preferred fluid pressure is pneumatic.

Another element of the apparatus 10 is a means 60 which is connected to the source of fluid pressure for initiating the supply of such predetermined pressure to the operating means 30, thereby causing an automatic application of such at least one brake means by the hand brake assembly 20.

Such apparatus 10 will further include a timing means 70 which is connected intermediate such operating means 30 and the source of fluid pressure 50 for controlling such predetermined pressure being periodically supplied to the operating means 30. Such timing means includes choke 21 and reservoir 22.

The final element of the apparatus 10, in the most preferred embodiment, will include an overload protection means 80. Such overload protection means 80, preferably, has a first portion 24 thereof that is connected to such source of fluid pressure 50 and a second portion 26 thereof that is connected to the operating means 30 for preventing an overload on such brake means.

As can be seen from the above discussion, the apparatus 10, of the present invention, provides a device that will enable an automatic application of a hand brake even in the event of a loss of an electrical signal. In this case, the hand brake can be push button applied rather than use of electronic braking. Electronic braking provides the advantage that all the brakes can be applied from the locomotive with proper controls. On the other hand, if one loses the electronic system, the push button can still initiate the hand brake. This would be a case where one would have a parallel system, i.e., push button and electronic. Additionally, with the electronic system it is possible to select certain hand brakes to be applied as a function of programming. In essence, the present invention provides a system which can be designed as three distinct schemes. One pneumatic, one electronic and a combination of both pneumatic and electronic.

Now turning to the present invention which is illustrated in FIGS. 5–9 and will be hereinafter referred to as Design II, shows an automatic hand brake application apparatus which has several distinct advantages over the previously discussed Design I. Primarily, the Design IT apparatus has a reduced weight, is a more compact design and increases air usage efficiencies than the Design I apparatus. Specifically, the automatic application hand brake of the invention, generally designated as 100 comprises an operating means, generally indicated as 110, having at least one ratchet 112 which is engageable with at least one gear 121 of a gear assembly, generally indicated as 120, disposed in a housing member 122 of the hand brake assembly. The operating means 110 causes the gear assembly 120 to rotate in a direction which will cause an application of at least one brake member (not shown). The apparatus further includes an application cylinder 124, which is mounted on the railway vehicle. The application cylinder 124 has a drive arm 126 extending from one end 128 thereof. The drive arm 126 is capable of reciprocating with respect to the application cylinder 124 upon the application of a force thereto to supply a predetermined pressure to the operating means 110 at least an amount which is sufficient to cause the application of at least one brake means.

A first portion 132 of this drive arm 126 is pivotally engageable with a first portion 135 of a lever 134. The lever also includes a second portion 137 which is engageable with the ratchet 112 as shown at 139. An operating pawl 136 is secured or pinned to the lever 134 and a spring means 34, as shown in FIG. 4, is provided for urging the operating pawl 136 into contact with the ratchet 112.

A means is provided for supplying a force within the application cylinder 124 which causes the drive arm 126 to move outwardly from the application cylinder 124 and apply a downward force to the lever 134 which causes the operating pawl 136 to engage a tooth 140 within the ratchet 112. This pressure supply source for supplying pressure to the drive arm 126 can be one of a pneumatic and a hydraulic pressure source.

A piston/spring arrangement similar to that shown in the design I embodiment (elements 32, 34 in FIGS. 3A and 4) may be provided within the application cylinder 124 to urge the drive arm 126 back to its original position.

Rotation of the ratchet 112 causes the gear of the hand brake gear assembly 120 to rotate in a direction which will cause an application of the brake means. Repeated applications of pressure within the application cylinder 124 enables the gear of the hand brake gear assembly 120 to rotate a sufficient amount to result in an application of the brakes.

A holding pawl 142 is also provided which cooperates with the ratchet 112. An application valve 144 is engageable with a second portion 146 of the drive arm 136 and a cam block 148 is provided on this second portion 146 of the drive arm 126.

As discussed above, FIG. 4 is a schematic illustration of the presently preferred operating mechanism including an activation means for use with the hand brake assembly of Design I. This operating mechanism can be converted for use with the presently disclosed automatic activation hand brake winding mechanism. This operating mechanism is discussed in detail above as well as in co-pending application Ser. No. 09/507,227.

Figure 1:
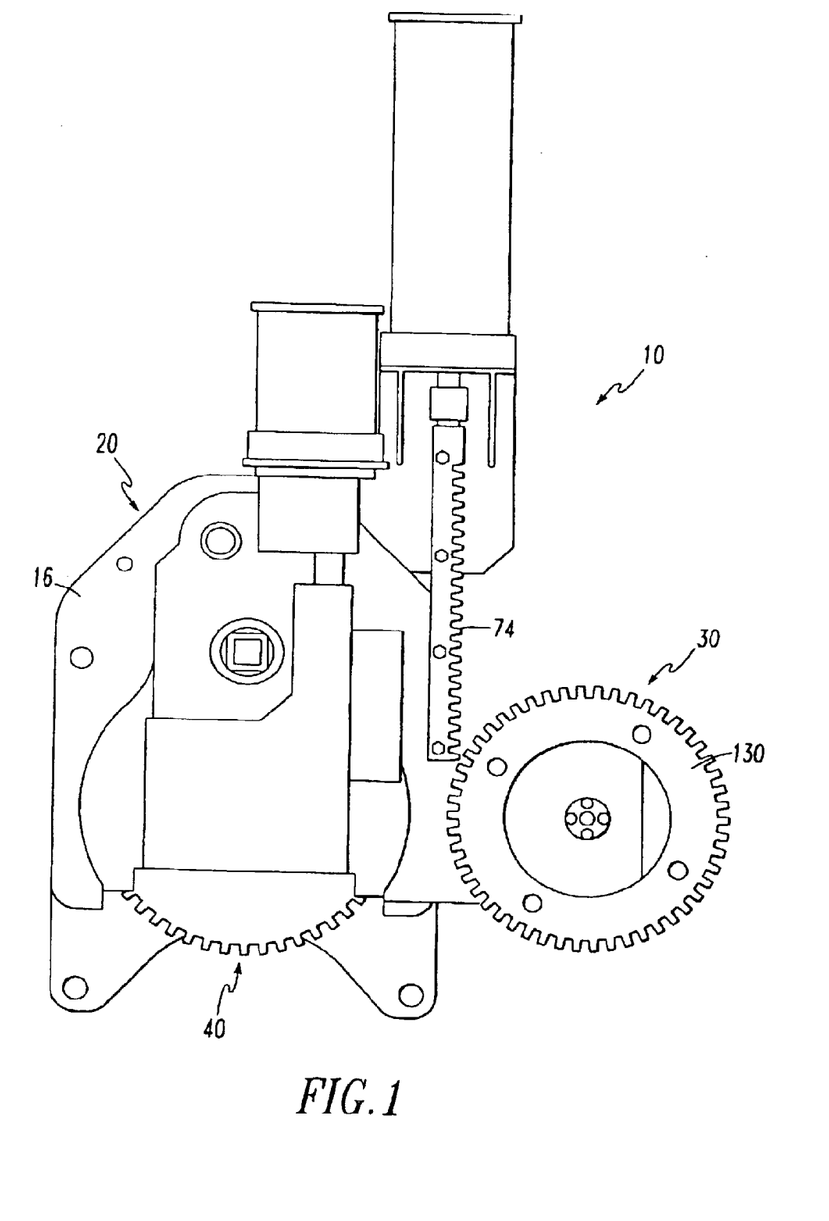
FIG. 1 is a front elevation view of a hand brake assembly incorporating a portion of the automatic application hand brake of co-pending application Ser. No. 09/507,227 (Design I).

FIGS. 1–3 show the "Design I" automatic application hand brake of the co-pending application of which the present invention improves upon. As discussed above, based upon data collected on the initial design of the automatic application hand brake of Design I, it was determined that the design would not meet all of the design input criteria for air usage. These input criteria are as follows:

1. Operate using the 3,500 cubic in air capacity available within the emergency reservoir.

2. Apply full brake loads at 90 psi and a minimum of 70 psi initial reservoir pressures.

3. Maximum of 40 psi cylinder pressure during application.

4. Achieve a minimum vertical chain load of 3,350 lbs.

5. 18 inches minimum chain take-up.

Table I, as follows, is a compilation of data collected from the initial design. The test used a 4,000 cubic inches capacity reservoir. The data collected was: Reservoir Pressure, Cylinder Pressure, and Horizontal Chain Load. Design I did achieve the vertical chain load requirements.

The test only accounted for 11.75" of chain take-up, therefore the data was extrapolated to account for 18" of chain take-up. A numerical model was developed which fir the data from the R&D test. The model accounted for 6" of additional slack chain take-up (assuming the amount of chain take-up correlated to 12 additional strakes at the minimum pressure seen from the test data (Table I). The numerical model results are shown in Tables 2 and 3. The Corrected Reservoir Pressure column is the data of interest. In Table 1, the initial reservoir pressure is 90 psi, at this starting condition, Design I would not have been able to achieve 18" of chain take-up, as well as, required chain load. In Table 3, the initial reservoir pressure is 70 psi. At this starting condition, Design I would not have been able to achieve 18" of chain take-up or the required chain load. The application would have ended at stroke #37 because the reservoir pressure and cylinder pressure would equalize. After the equalization point, the reservoir would not have enough air pressure to continue the application.

Also, these cases were using an initial reservoir capacity of 4,000 cubic inches, not the 3,500 cubic inches per the requirement. Thus, reducing the capacity by 500 cubic inches would reduce the efficiencies further. Therefore in both the R&D test and the numerical model, Design I would have required more air than available in an actual field application, and did not meet criteria 1, 2 & 3 listed above.

The ratchet design proposed for the present invention (Design II) is more compact and will use a smaller cylinder diameter than Design I. Table 4 highlights the overall design differences between the two design. Graph 1 is a plot of the numerical model results for the present invention (Design II) for the initial reservoir pressure condition of 90 psi and 70 psi. Graph 2 is the results of manually testing Design II. Therefore as a result of the model and the initial design testing, it is expected that the design will achieve all the criteria specified above when the automatic application hand brake of the invention is operated in the fully automatic mode.

To follow are Tables 1–4 and Graphs 1–2, as discussed above.

TABLE 1

R&D Test Data from ASR Hand Brake Design I
4000 cu-in
11.75 in take up

| # Strokes | Cylinder Pressure (psi) | Reservoir Pressure (psi) | Horizontal Chain Force (lb) | Vertical Chain Force (lb) |
| --- | --- | --- | --- | --- |
| 0 | 0.0747 | 89.1386 | 1.7986 | 1.9984 |
| 1 | 22.0378 | 81.1688 | 1.7986 | 1.9984 |

TABLE 1-continued

R&D Test Data from ASR Hand Brake Design I
4000 cu-in
11.75 in take up

| # Strokes | Cylinder Pressure (psi) | Reservoir Pressure (psi) | Horizontal Chain Force (lb) | Vertical Chain Force (lb) |
|---|---|---|---|---|
| 2 | 23.7733 | 82.5117 | 43.5266 | 48.3629 |
| 3 | 24.0862 | 81.6067 | 65.11 | 72.3444 |
| 4 | 24.3423 | 80.3513 | 161.516 | 179.4622 |
| 5 | 24.1431 | 79.6215 | 193.1717 | 214.6352 |
| 6 | 23.8871 | 79.3296 | 223.3885 | 248.2094 |
| 7 | 23.2043 | 78.3662 | 244.9719 | 272.1910 |
| 8 | 23.8586 | 77.0817 | 243.533 | 270.5922 |
| 9 | 23.8586 | 76.4394 | 253.6053 | 281.7837 |
| 10 | 24.3423 | 75.4176 | 375.9113 | 417.6792 |
| 11 | 24.769 | 73.6952 | 636.3513 | 707.0570 |
| 12 | 25.651 | 71.856 | 863.6968 | 959.6631 |
| 13 | 23.8871 | 71.7977 | 921.2526 | 1023.6140 |
| 14 | 29.2072 | 70.4548 | 1137.0868 | 1263.4298 |
| 15 | 27.9838 | 69.8709 | 1260.8318 | 1400.9242 |
| 16 | 31.7676 | 68.4404 | 1341.4099 | 1490.4554 |

TABLE 1-continued

R&D Test Data from ASR Hand Brake Design I
4000 cu-in
11.75 in take up

| # Strokes | Cylinder Pressure (psi) | Reservoir Pressure (psi) | Horizontal Chain Force (lb) | Vertical Chain Force (lb) |
|---|---|---|---|---|
| 17 | 34.385 | 67.769 | 1935.6736 | 2150.7484 |
| 18 | 40.6724 | 66.1925 | 2226.3303 | 2473.7003 |
| 19 | 40.1319 | 66.1341 | 2227.7693 | 2475.2992 |
| 20 | 23.4034 | 65.4335 | 2325.6143 | 2584.0159 |
| 21 | 39.7336 | 64.8204 | 2593.2485 | 2881.3872 |
| 22 | 46.1916 | 62.0762 | 3052.2561 | 3391.3957 |
| 23 | 28.3537 | 61.3756 | 2737.1382 | 3041.2647 |
| 24 | 52.3083 | 61.6675 | 3258.0181 | 3620.0201 |
| 25 | 54.0722 | 59.3029 | 3439.3188 | 3821.4653 |
| 26 | 22.3223 | 57.1717 | 3351.5464 | 3723.9404 |
| 27 | 22.5499 | 56.4711 | 3348.6685 | 3720.7428 |
| 28 | 58.1974 | 58.6606 | 3587.5251 | 3986.1390 |

Note: R&D Test only accounted for 11.75" of Chain Take-up

TABLE 2

Numerical Model Developed Using Data from TABLE 1 with 90 psi starting Reservoir Pressure and counting for 18" of Chain Take-Up

| # Stokes | Model mass | Reservoir pressure | Corrected Reservoir Pressure | Cylinder pressure data | Air Usage per Stroke | 4000 in 3 Reservoir Pressure |
|---|---|---|---|---|---|---|
| 0 | 1.0480 | 90.00 | 90.00 | 0 | 0.0000 | |
| 1 | 1.0402 | 89.33 | 89.14 | 24.5 | 0.0078 | |
| 2 | 1.0328 | 88.70 | 88.32 | 23.2 | 0.0074 | |
| 3 | 1.0254 | 88.06 | 87.50 | 23.2 | 0.0074 | |
| 4 | 1.0181 | 87.43 | 86.68 | 23.2 | 0.0074 | |
| 5 | 1.0107 | 86.80 | 85.86 | 23.2 | 0.0074 | |
| 6 | 1.0033 | 86.16 | 85.05 | 23.2 | 0.0074 | |
| 7 | 0.9959 | 85.53 | 84.24 | 23.2 | 0.0074 | |
| 8 | 0.9885 | 84.89 | 83.43 | 23.2 | 0.0074 | |
| 9 | 0.9812 | 84.26 | 82.63 | 23.2 | 0.0074 | |
| 10 | 0.9738 | 83.63 | 81.83 | 23.2 | 0.0074 | |
| 11 | 0.9664 | 82.99 | 81.03 | 23.2 | 0.0074 | |
| 12 | 0.9590 | 82.36 | 80.23 | 23.2 | 0.0074 | |
| 13 | 0.9516 | 81.73 | 79.44 | 23.2 | 0.0074 | |
| 14 | 0.9443 | 81.09 | 78.65 | 23.2 | 0.0074 | |
| 15 | 0.9369 | 80.46 | 77.86 | 23.2 | 0.0074 | |
| 16 | 0.9291 | 79.79 | 77.04 | 24.6 | 0.0078 | 89.1386 |
| 17 | 0.9213 | 79.12 | 76.23 | 24.3 | 0.0077 | 81.1688 |
| 18 | 0.9140 | 78.49 | 75.45 | 23.2 | 0.0074 | 82.5117 |
| 19 | 0.9063 | 77.84 | 74.66 | 23.9 | 0.0076 | 81.6067 |
| 20 | 0.8987 | 77.17 | 73.86 | 24.2 | 0.0077 | 80.3513 |
| 21 | 0.8910 | 76.51 | 73.06 | 24.2 | 0.0077 | 79.6215 |
| 22 | 0.8831 | 75.84 | 72.25 | 24.6 | 9.0078 | 79.3296 |
| 23 | 0.8753 | 75.17 | 71.45 | 24.7 | 0.0079 | 78.3662 |
| 24 | 0.8675 | 74.50 | 70.65 | 24.5 | 0.0078 | 77.0817 |
| 25 | 0.8600 | 73.86 | 69.89 | 23.4 | 0.0074 | 76.4394 |
| 26 | 0.8521 | 73.18 | 69.09 | 24.8 | 0.0079 | 75.4176 |
| 27 | 0.8442 | 72.49 | 68.29 | 25.1 | 0.0080 | 73.6952 |
| 28 | 0.8360 | 71.80 | 67.47 | 25.6 | 0.0081 | 71.856 |
| 29 | 0.8283 | 71.14 | 66.70 | 24.1 | 0.0077 | 71.7977 |
| 30 | 0.8194 | 70.37 | 65.83 | 28.1 | 0.0089 | 70.4548 |
| 31 | 0.8118 | 69.72 | 65.07 | 23.9 | 0.0076 | 69.8709 |
| 32 | 0.8042 | 69.06 | 64.31 | 23.9 | 0.0076 | 68.4404 |
| 33 | 0.7943 | 68.22 | 63.38 | 31 | 0.0099 | 67.769 |
| 34 | 0.7858 | 67.48 | 62.55 | 26.9 | 0.0086 | 66.1925 |
| 35 | 0.7755 | 66.60 | 61.59 | 32.2 | 0.0102 | 66.1341 |
| 36 | 0.7638 | 65.59 | 60.52 | 36.9 | 0.0117 | 65.4335 |
| 37 | 0.7509 | 64.48 | 59.35 | 40.7 | 0.0129 | 64.8204 |
| 38 | 0.7389 | 63.46 | 58.27 | 37.5 | 0.0119 | 62.0762 |
| 39 | 0.7242 | 62.19 | 56.98 | 46.3 | 0.0147 | 61.3756 |
| 40 | 0.7081 | 60.81 | 55.58 | 50.5 | 0.0161 | 61.6675 |

TABLE 3

Numerical Model Developed Using Data from TABLE 1 with 70 psi starting Reservoir Pressure and counting for 18" of Chain Take-Up

| # Stokes | Model air mass | Reservoir pressure | Corrected Reservoir Pressure | Cylinder pressure data | Air Usage per Stroke | 4000 in 3 Reservoir Pressure |
|---|---|---|---|---|---|---|
| 0 | 0.8151 | 70.00 | 70.00 | 0 | 0.0000 | |
| 1 | 0.8073 | 69.33 | 69.18 | 24.5 | 0.0078 | |
| 2 | 0.7999 | 68.70 | 68.40 | 23.2 | 0.0074 | |
| 3 | 0.7926 | 68.06 | 67.62 | 23.2 | 0.0074 | |
| 4 | 0.7852 | 67.43 | 66.85 | 23.2 | 0.0074 | |
| 5 | 0.7778 | 66.80 | 66.08 | 23.2 | 0.0074 | |
| 6 | 0.7704 | 66.16 | 65.31 | 23.2 | 0.0074 | |
| 7 | 0.7630 | 65.53 | 64.54 | 23.2 | 0.0074 | |
| 8 | 0.7557 | 64.89 | 63.78 | 23.2 | 0.0074 | |
| 9 | 0.7483 | 64.26 | 63.02 | 23.2 | 0.0074 | |
| 10 | 0.7409 | 63.63 | 62.26 | 23.2 | 0.0074 | |
| 11 | 0.7335 | 62.99 | 61.50 | 23.2 | 0.0074 | |
| 12 | 0.7261 | 62.36 | 60.75 | 23.2 | 0.0074 | |
| 13 | 0.7188 | 61.73 | 60.00 | 23.2 | 0.0074 | |
| 14 | 0.7114 | 61.09 | 59.25 | 23.2 | 0.0074 | |
| 15 | 0.7040 | 60.46 | 58.51 | 23.2 | 0.0074 | |
| 16 | 0.6962 | 59.79 | 57.73 | 24.6 | 0.0078 | 89.1386 |
| 17 | 0.6884 | 59.12 | 56.96 | 24.3 | 0.0077 | 81.1688 |
| 18 | 0.6811 | 58.49 | 56.22 | 23.2 | 0.0074 | 82.5117 |
| 19 | 0.6735 | 57.84 | 55.47 | 23.9 | 0.0076 | 81.6067 |
| 20 | 0.6658 | 57.17 | 54.72 | 24.2 | 0.0077 | 80.3513 |
| 21 | 0.6581 | 56.51 | 53.96 | 24.2 | 0.0077 | 79.6215 |
| 22 | 0.6502 | 55.84 | 53.20 | 24.6 | 0.0078 | 79.3296 |
| 23 | 0.6424 | 55.17 | 52.44 | 24.7 | 0.0079 | 78.3662 |
| 24 | 0.6346 | 54.50 | 51.69 | 24.5 | 0.0078 | 77.0817 |
| 25 | 0.6271 | 53.86 | 50.96 | 23.4 | 0.0074 | 76.4394 |
| 26 | 0.6193 | 53.18 | 50.21 | 24.8 | 0.0079 | 75.4176 |
| 27 | 0.6113 | 52.49 | 49.45 | 25.1 | 0.0080 | 73.6952 |
| 28 | 0.6031 | 51.80 | 48.68 | 25.6 | 0.0081 | 71.856 |
| 29 | 0.5955 | 51.14 | 47.95 | 24.1 | 0.0077 | 71.7977 |
| 30 | 0.5865 | 50.37 | 47.12 | 28.1 | 0.0089 | 70.4548 |
| 31 | 0.5789 | 49.72 | 46.40 | 23.9 | 0.0076 | 69.8709 |
| 32 | 0.5713 | 49.06 | 45.69 | 23.9 | 0.0076 | 68.4404 |
| 33 | 0.5615 | 48.22 | 44.80 | 31 | 0.0099 | 67.769 |
| 34 | 0.5529 | 47.48 | 44.01 | 26.9 | 0.0086 | 66.1925 |
| 35 | 0.5427 | 46.60 | 43.10 | 32.2 | 0.0102 | 66.1341 |
| 36 | 0.5309 | 45.59 | 42.07 | 36.9 | 0.0117 | 65.4335 |
| 37 | 0.5180 | 44.48 | 40.94 | 40.7 | 0.0129 | 64.8204 |
| 38 | 0.5060 | 43.46 | 39.91 | 37.5 | 0.0119 | 62.0762 |
| 39 | 0.4913 | 42.19 | 38.66 | 46.3 | 0.0147 | 61.3756 |
| 40 | 0.4753 | 40.81 | 37.30 | 50.5 | 0.0161 | 61.6675 |

TABLE 4

Major Design Differences between Design I and Design II

| | Design I | Design II |
|---|---|---|
| Application Cylinder Size | Diameter: 3.75" Length: ~13" | Diameter: 3.25" Length: ~8"–10" |
| Application Stroke Length | 10" | 6" |
| Weight | ~154 lb | ~109 lb |
| Dimensional Outline | Height × Width 37.28" × 25" | Height × Width 27" × 20" |

The design of the present invention Design II utilizes the same operating features as Design I. The benefits of the present invention (Design II) verses Design I are that the automatic application hand brake of the invention weighs less than Design I, has a more compact design and increases the air usage efficiencies.

While the presently preferred embodiments for carrying out the instant invention have been set forth in detail above, those persons skilled in the hand brake art to which this invention pertains will recognize various alternative ways of practicing the invention without departing from the spirit and scope of the invention. Persons who possess such skill will also recognize that the foregoing description is merely illustrative and not intended to limit any of the ensuing claims to any particular narrow interpretation.

We claim:

1. An apparatus engageable with a hand brake assembly for automatically applying at least one brake means secured to a railway vehicle with said hand brake assembly, said apparatus comprising:

(a) an operating means having at least one ratchet, said at least one ratchet being engageable with at least one gear of a gear assembly disposed in a housing member of said hand brake assembly for operating said gear assembly in a direction which will cause an application of said at least one brake means, said operating means further including a lever having a first and second portion, said second portion being engageable with said at least one ratchet, and an operating pawl secured to said lever for engaging a tooth within said ratchet upon the application of said force to said lever and to cause rotation of said at least one ratchet;

(b) an application cylinder mounted on said railway vehicle;

(c) a drive arm extending from an end of said application cylinder, said drive arm having a first portion pivotally engageable with said first portion of said lever of said operating means, said drive arm capable of reciprocating with respect to said application cylinder upon the application of a force thereto to supply a predetermined pressure to said operating means at least an amount which is sufficient to cause such application of said at least one brake means; and (d) a pressure supply source connected to said application cylinder for supplying a force to said drive arm thereby causing an automatic application of said at least one brake means by said hand brake assembly.

2. The apparatus engageable with a hand brake assembly for automatically applying at least one brake means secured to a railway vehicle with said hand brake assembly as recited in claim 1, wherein said operating means further includes a spring means secured to said lever for urging said operating pawl into contact with said tooth within said ratchet.

3. The apparatus engageable with a hand brake assembly for automatically applying at least one brake means secured to a railway vehicle with said hand brake assembly as recited in claim 1, further including a holding pawl mounted to said housing member of said hand brake assembly, said holding pawl capable of cooperating with said at least one ratchet of said operating means.

4. The apparatus engageable with a hand brake assembly for automatically applying at least one brake means secured to a railway vehicle with said hand brake assembly as recited in claim 1, wherein said application cylinder includes a piston/spring arrangement for urging said drive arm to its original position within said application cylinder upon the release of said force thereto.

5. The apparatus engageable with a hand brake assembly for automatically applying at least one brake means secured to a railway vehicle with said hand brake assembly as recited in claim 1, wherein said means for supplying a force to said drive arm is capable of applying repeated application of pressure with the application cylinder in order to rotate said gear of said hand brake assembly a sufficient amount to result in an application of such at least one brake means secured to such railway vehicle.

6. The apparatus engageable with a hand brake assembly for automatically applying at least one brake means secured to a railway vehicle with said hand brake assembly as recited in claim 1, wherein said pressure supply source for supplying pressure to said drive arm is one of a pneumatic and a hydraulic pressure source.

7. The apparatus engageable with a hand brake assembly for automatically applying at least one brake means secured to a railway vehicle with said hand brake assembly as recited in claim 1, further including an application valve engageable with a second portion of said drive arm.

8. The apparatus engageable with a hand brake assembly for automatically applying at least one brake means secured to a railway vehicle with said hand brake assembly as recited in claim 4, wherein a second portion of said drive arm includes a cam block secured thereto.

9. The apparatus engageable with a hand brake assembly for automatically applying at least one brake means secured to a railway vehicle with said hand brake assembly as recited in claim 1, wherein said application cylinder has a diameter of approximately 3.25".

10. The apparatus engageable with a hand brake assembly for automatically applying at least one brake means secured to a railway vehicle with said hand brake assembly as recited in claim 1, wherein said application cylinder has a length of approximately 8–10".

11. The apparatus engageable with a hand brake assembly for automatically applying at least one brake means secured to a railway vehicle with said hand brake assembly as recited in claim 1, wherein said application cylinder has a weight of less than 110 lbs.

12. The apparatus engageable with a hand brake assembly for automatically applying at least one brake means secured to a railway vehicle with said hand brake assembly as recited in claim 1, wherein said drive arm has an application stroke length of approximately 6".

* * * * *